(12) United States Patent
Mambakkam et al.

(10) Patent No.: US 6,859,361 B1
(45) Date of Patent: Feb. 22, 2005

(54) FLASH MEDIA READING DEVICES WITH INTEGRATED STORAGE COMPARTMENTS

(75) Inventors: Sreenath Mambakkam, San Jose, CA (US); Arockiyaswamy Venkidu, Menlo Park, CA (US); Larry Lawson Jones, Stockton, CA (US)

(73) Assignee: OnSpec Electronic Inc., Santa Clara, CA (US)

( * ) Notice: Subject to any disclaimer, the term of this patent is extended or adjusted under 35 U.S.C. 154(b) by 0 days.

(21) Appl. No.: 10/065,763

(22) Filed: Nov. 15, 2002

(51) Int. Cl.[7] .............................................. G06K 13/08
(52) U.S. Cl. ..................... 361/684; 439/638; 364/708.1
(58) Field of Search ................................ 361/684–687, 361/679–683, 724–727; 439/638; 364/708.1

(56) References Cited

U.S. PATENT DOCUMENTS

| | | | |
|---|---|---|---|
| 6,173,405 B1 * | 1/2001 | Nagel ........................... | 713/200 |
| 6,190,182 B1 * | 2/2001 | Liebenow et al. ............. | 439/74 |
| 6,246,578 B1 * | 6/2001 | Wei et al. ..................... | 361/686 |
| 6,285,555 B1 * | 9/2001 | O'Neal et al. ............... | 361/727 |
| 6,456,491 B1 * | 9/2002 | Flannery et al. ............ | 361/685 |
| 6,477,604 B1 * | 11/2002 | Chen ........................... | 710/301 |
| 6,522,552 B1 * | 2/2003 | Lee .............................. | 361/752 |
| 6,523,079 B2 * | 2/2003 | Kikinis et al. .............. | 710/303 |

* cited by examiner

Primary Examiner—Hung Van Duong
(74) Attorney, Agent, or Firm—Blakely Sokoloff Taylor & Zafman LLP

(57) ABSTRACT

A memory card interface apparatus including a bay to receive a memory card for accessing data stored on the card, and a separate storage cavity configured to store a memory card. In one embodiment, the cavity includes an aperture providing access to remove a card from the storage cavity. In one embodiment, the cavity includes an element protruding out a side of the storage cavity to retain a card within the storage cavity. In one embodiment, the apparatus includes at least a second separate storage cavity configured to store a memory card. In one embodiment, the apparatus includes at least a third separate storage cavity configured to store a memory card. In one embodiment, the apparatus comprises a toner configuration. In one embodiment, the apparatus is configured to attach to a separate add-on configuration, the separate add-on configuration providing storage for additional memory cards. The apparatus of claim 9, wherein the apparatus includes at least a third separate storage area configured to store a memory card.

11 Claims, 4 Drawing Sheets

FLASH MEDIA READING DEVICES WITH INTEGRATED STORAGE COMPARTMENTS

COPYRIGHT STATEMENT

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF INVENTION

1. Field

The present invention relates generally to flash memory readers, and more specifically to an improved configuration of the same.

2. Background

Flash medium reading devices have recently increased in popularity, in part, due to the recent proliferation of Digital cameras. For example, in a recent year, more digital cameras were sold than traditional film cameras. Images from digital cameras can be downloaded and stored on personal computers. Digital pictures can be converted to common formats such as JPEG and sent as e-mail attachments or posted to virtual photo albums on the Internet. Video as well as still images can be captured, depending on the kind of digital camera.

Digital cameras typically capture images electronically and ultimately store the images as bits (ones and zeros) on a solid-state memory. Flash memory is the most common storage for digital cameras.

Flash medium reading devices are often small and compact to allow for easy portability in conjunction with notebook computers, PDAs, etc. However, such devices must have a certain minimal size to make them reasonably easy to handle and easy for the user to handle, use, insert and remove cards, etc. As a result, the flash medium card enclosure may contain a certain amount of empty space. It is also the case that a traveler on a long journey may need to take multiple flash medium cards of various types, for which he then must carry a sufficient number of protective cases.

What is clearly needed is a flash card reading device that not only can read a card but also uses the extra space often included in flash card readers to provide secure, clean storage for additional cards that are not currently in use.

SUMMARY OF INVENTION

An embodiment of the present invention provides a memory card interface apparatus including a bay to receive a memory card for accessing data stored on the card, and a separate storage cavity configured to store a memory card in one embodiment, the cavity includes an aperture providing access to remove a card from the storage cavity. In one embodiment, the cavity includes an element protruding out a side of the storage cavity to retain a card within the storage cavity. In one embodiment, the apparatus includes at least a second separate storage cavity configured to store a memory card. In one embodiment, the apparatus includes at least a third separate storage cavity configured to store a memory card. In one embodiment, the apparatus comprises a tower configuration. In one embodiment, the apparatus is configured to attach to a separate add-on configuration, the separate add-on configuration providing storage for additional memory cards Other features and advantages of embodiments of the present invention will be apparent from the accompanying drawings, and from the detailed description, that follows below.

BRIEF DESCRIPTION OF DRAWINGS

The invention may be best understood by referring to the following description and accompanying drawings that are used to illustrate embodiments of the invention. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Reference throughout the specification to "one embodiment" or "an embodiment" means that a particular feature, structure, or characteristic described in connection with the embodiment is included in at least one embodiment of the present invention. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Figure 1:
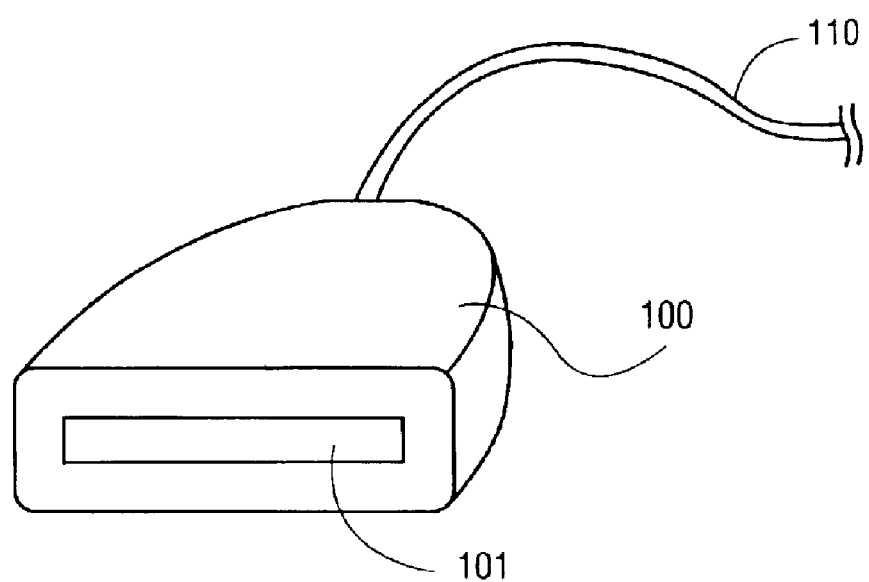
FIG. 1 illustrates one of the basic types of the prior art of card readers.

Flash medium card reading devices have essentially two design types. FIG. 1 shows one of the basic types of the prior art of card readers. Device 100 is essentially flat and somewhat triangular in shape, with a connector, such as a USB connector, or cable 110 coming out of its tail and a slot 101 on the opposite side of the device. Typically its thickness is that of about three to five flash cards, but the interconnect electronic components usually occupy only the thickness of about two cards. The unit is typically made of two plastic shells that snap together, thus enclosing the electronic components of the unit.

Figure 2:
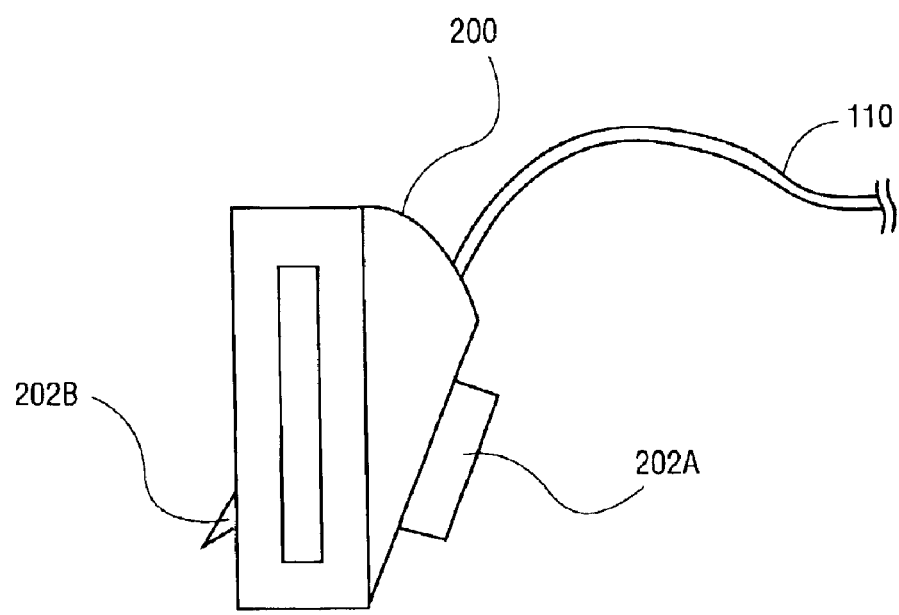
FIG. 2 illustrates an alternative prior art of card readers.

FIG. 2 shows the other basic type of the prior art of card readers, which has the shape of a small tower 200. It has a slot 201 at the front, two legs 202a and 202b, and a cable 110 extending out from the end.

Figure 3:
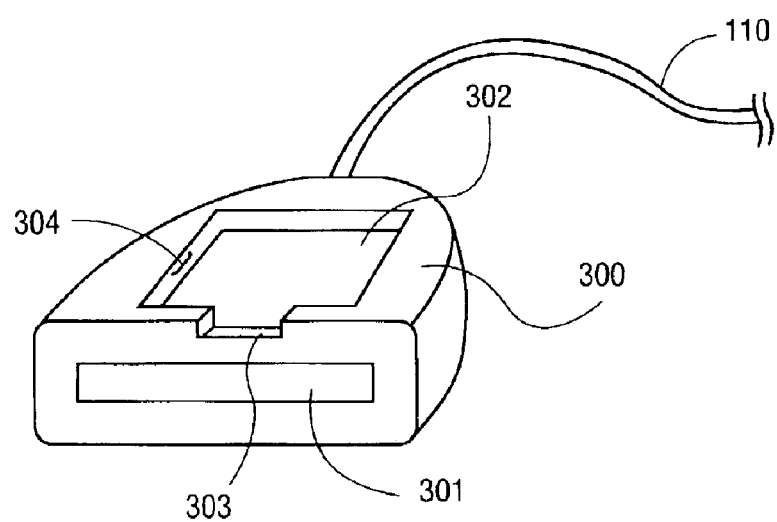
FIG. 3 illustrates the present invention as implemented on a flash card reading device, in accordance with one embodiment.

FIG. 3 illustrates one embodiment of the present invention as implemented on a flash card reading device shown in FIG. 1. Card reader 300 has a storage cavity 302 (also referred to herein as a storage area) added to the top half of the device shell. In one embodiment, the cavity includes two additional elements. The first such element is cutout 303 (also referred to herein as an aperture) to extract the flash card from the cavity. The cutout 303 may have any of various shapes and forms. One such simple example form is an opening that allows the user to insert a finger, fingernail, or tool to grab and extract the card.

The second element 304, in one embodiment, is a spring or bump (the bump may be designed and fabricated of a material such that it acts as if it is spring loaded) to retain the flash card when it is inserted in storage cavity 302. Both these elements 303 and 304 may have any of many various and diverse forms, using buttons, levers, springs, etc., either solely or in combinations, without departing from the spirit of their respective functions, which are, for element 304, to retain the card, and, for cutout 303, to extract the card.

Figure 4A:
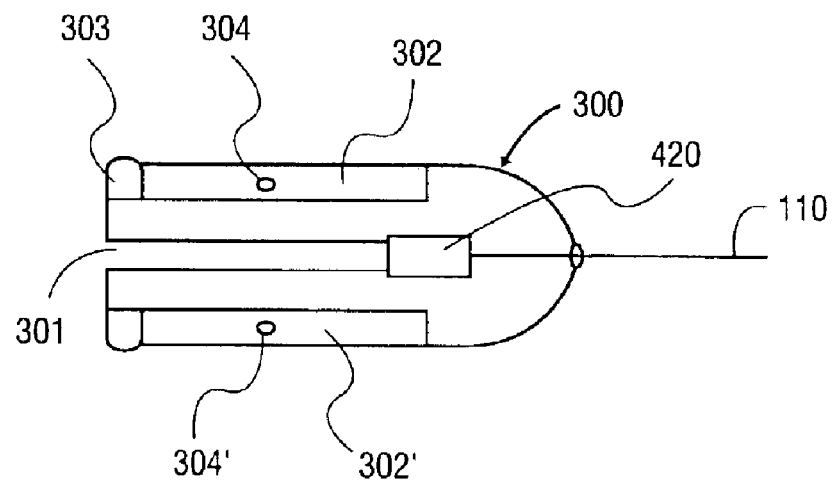
FIGS. 4a–b illustrate the present invention as implemented on a flash card reading device in a tower configuration, in accordance with one embodiment.
Figure 4B:
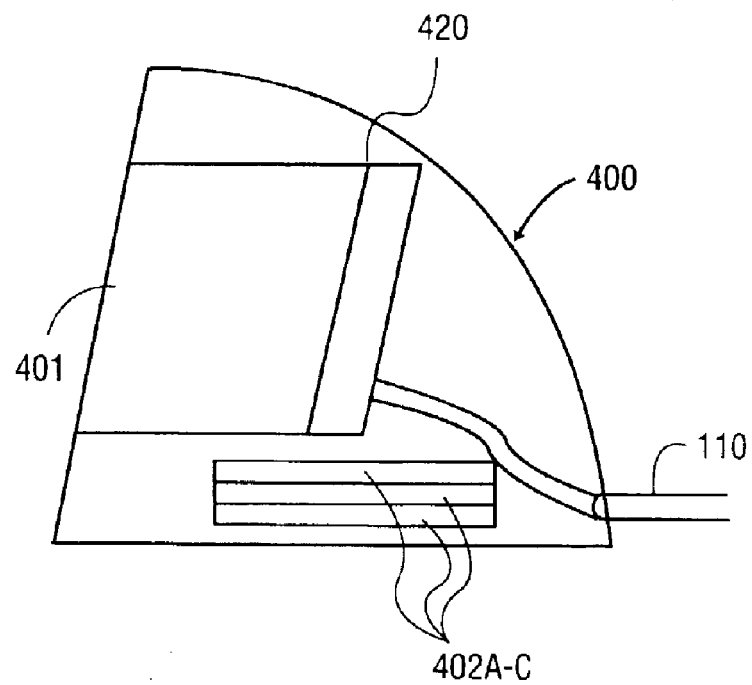

FIGS. 4a–b illustrate two embodiments of having a storage cavity in tower 400, similar to the mini-tower device shown in FIG. 2. FIG. 4a illustrates a top cross section of one embodiment; whereas FIG. 4b illustrates a mini-tower side cross section of an alternative embodiment.

As illustrated in the embodiment shown in FIG. 4a, two cavities 302 and 302' have are included in the tower, each with its own retainer mechanism 304 and 304', respectively, and release mechanism 303 and 303', respectively. Also shown in FIG. 4 is slot 301 and, in simplified form, electronic components 420, which connect to cable 110. As previously discussed, a USB connector may alternatively be used to connect directly to the device.

FIG. 4b is a side view of another tower 400 with slot 401 and electronics 420; however, in this example, in the feet 202 are three storage bays/cavities, 402a, 402b, and 402c, for three cards. In one embodiment, the bays may use sliding trays to insert and extract the flash cards.

In alternative embodiments, for example, a pop-out mechanism may be used to insert and remove cards. In such a case, the card is inserted at the side and held in place by a retainer (not shown) such as spring, bump, or other mechanism. In one embodiment, at the far end is a button-type mechanism (not shown) similar to the push-button mechanism, similar to a ballpoint pen design. In one embodiment, the button mechanism has two stable positions, one recessed and one released. Thus when the user inserts the card, the button shifts to the recessed position. When the button is pushed further, the card pops out sufficiently that the user can grasp it and pull it out. As noted above, other functionally equivalent mechanisms, such as buttons, levers, springs, etc. may be used to push out a selected card from the opposite side so it can be conveniently extracted, without departing from the scope of the invention.

The convenient storage provided by the present application, allows the user to reduce clutter, particularly when traveling, as well as in many other applications. In alternative embodiments, the number of additional storage slots may be further increased by use of an add-on case that may be snapped onto an existing device or put under the device as a base, providing storage for not only three or four, but ten, twenty, or an even greater number of cards.

Such add-on storage cases may employ the push-in, push-out mechanisms described above, similar to that of a ballpoint per, to allow easy access to selected cards. Alternatively, release buttons may be on alternate sides, left and right, of the slots, thus allowing additional space between the buttons for the user's fingers to buttons.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A memory card reader comprising:
   a housing defining a slot shaped and dimensioned to receive a first memory card therein, and a memory card storage mechanism to store at least one second memory card therein, the storage mechanism is defined by a second slot shaped and dimensioned to receive the second memory card therein, the storage mechanism comprises a card ejector mechanism to facilitate removal of the second memory card from the second slot; and
   an electronic component to read the first memory card.

2. The memory card reader of claim 1, wherein the storage mechanism is defined by a recess formed in the housing, the recess being shaped and dimensioned to receive the second memory card therein.

3. The memory card reader of claim 1, wherein a part of the housing adjacent the recess is cut-away to define a gap into which a finger can be inserted to facilitate removal of the second memory card from the recess.

4. The memory card reader of claim 1, wherein the storage mechanism further comprises a memory card retaining mechanism to retain the second memory card in the slot therefor.

5. The memory card reader of claim 1, wherein the memory card storage mechanism stores at least two second memory cards.

6. A housing for a memory card reader, the housing comprising:
   a first slot shaped and dimensioned to receive a first memory card therein while said memory card is being read by an electronic component; and
   at least one storage mechanism shaped and dimensioned to store at least one second memory card therein, the storage mechanism is defined by a second slot shaped and dimensioned to receive the second memory card therein, the storage mechanism further comprises a card ejector mechanism to facilitate removal of the second memory card from the second slot.

7. The housing of claim 6, wherein the storage mechanism is defined by a recess formed in the housing, the recess being shaped and dimensioned to receive the second memory card therein.

8. The housing of claim 6, wherein a part of the housing adjacent the recess is cut-away to define a gap within which at least a portion of a finger can be inserted to facilitate removal of the second memory card from the recess.

9. The housing of claim 6, wherein the storage mechanism further comprises a memory card retaining mechanism to retain the second memory card in the second slot.

10. The housing of claim 6, wherein the memory card storage mechanism stores at least two second memory cards.

11. A memory card reader comprising:
    a housing defining a slot shaped and dimensioned to receive a first memory card therein, and a memory card storage mechanism to store at least one second memory card therein; and
    an electronic component to read the first memory card, wherein the first part of the housing is cut-away to define a gap into which a finger can be inserted to facilitate removal of the second memory card.

* * * * *

UNITED STATES PATENT AND TRADEMARK OFFICE
CERTIFICATE OF CORRECTION

PATENT NO. : 6,859,361 B1
DATED : February 22, 2005
INVENTOR(S) : Mambakkam et al.

It is certified that error appears in the above-identified patent and that said Letters Patent is hereby corrected as shown below:

Title page,
Item [57], ABSTRACT,
Line 13, delete "toner" and insert -- tower --.

Column 1,
Line 53, delete "card in" and insert -- card. In --.

Column 3,
Line 61, delete "per" and insert -- pen --.
Line 64, before "buttons", insert -- push selected --.

Signed and Sealed this

Twenty-eighth Day of June, 2005

JON W. DUDAS
*Director of the United States Patent and Trademark Office*